Dec. 4, 1934.  R. A. MUELLER  1,983,390
BOTTLE STERILIZING DEVICE
Filed June 23, 1932
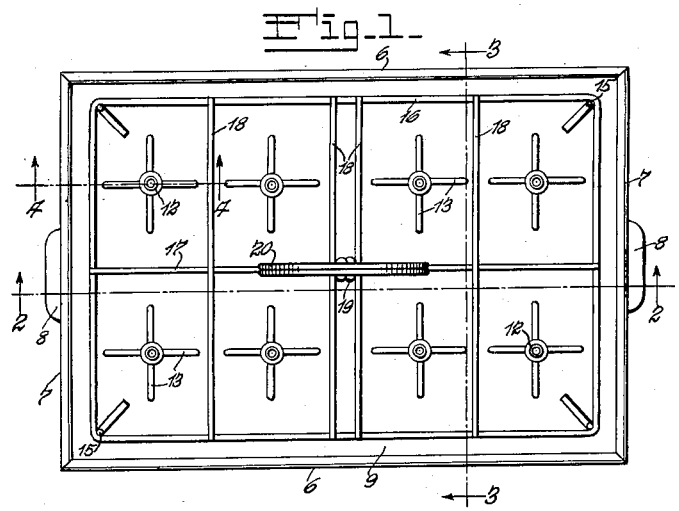
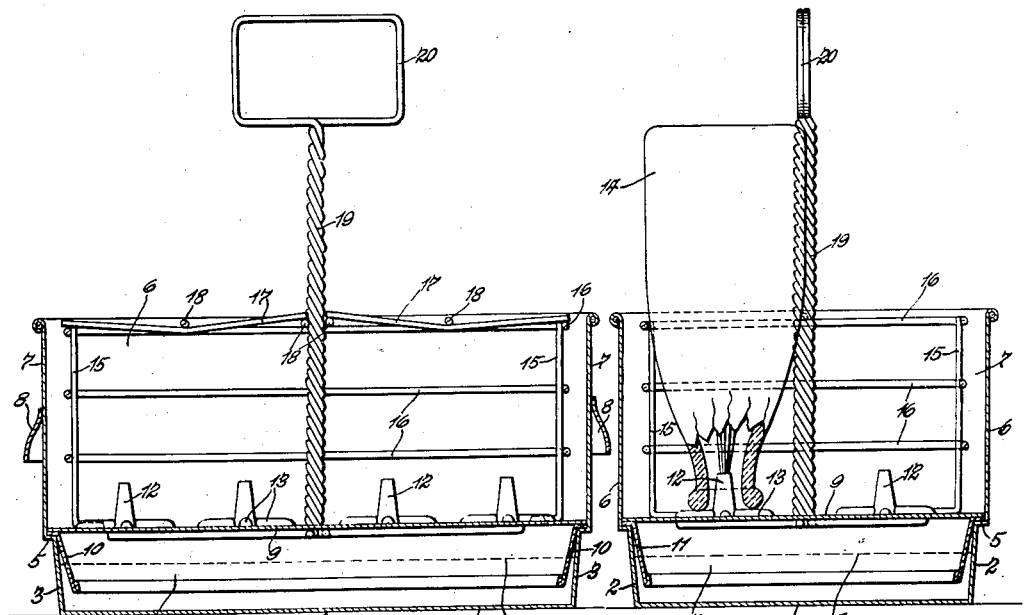
Inventor
Russell A. Mueller
by Rippey & Kingsland
His Attorneys Patented Dec. 4, 1934

1,983,390

UNITED STATES PATENT OFFICE 1,983,390

BOTTLE STERILIZING DEVICE

Russell A. Mueller, Belleville, Ill.

Application June 23, 1932, Serial No. 618,823

3 Claims. (Cl. 141—7)

This invention relates to bottle sterilizing devices of the portable type.

An object of the invention is to provide an improved device for sterilizing bottles comprising a water receptacle, in combination with a plate or secondary bottom wall designed and adapted to be inserted in and removed from the receptacle, means for supporting said plate or secondary bottom wall within said receptacle and above the surface of the water, and means for directing steam jets through said plate or secondary bottom wall and into the bottles supported in position to receive said steam jets when steam is generated by heating the water.

Another object of the invention is to provide an improved bottle sterilizing device comprising a portable supporting device designed and adapted to support bottles in position in which steam may be injected into the bottles, and means for supporting said supporting device within a receptacle containing water adapted to be heated to generate steam that is injected into the bottles.

Another object of the invention is to provide an improved bottle sterilizing device embodying the improved features of construction and arrangement of parts herein disclosed, reference being made to the accompanying drawing, in which—

Fig. 1 is a plan view of my improved bottle sterilizing device.

Fig. 2 is a vertical longitudinal sectional view approximately on the line 2—2 of Fig. 1.

Fig. 3 is a vertical transverse sectional view approximately on the line 3—3 of Fig. 1.

Fig. 4 is an enlarged vertical sectional view approximately on the line 4—4 of Fig. 1.

The improved water receptacle comprises a bottom wall 1 having upwardly extended side walls 2 and end walls 3 in connection with the sides and ends thereof and having impervious connection with each other and with said bottom wall. These bottom, side and end walls provide a water receptacle designed and adapted to contain water to any appropriate height as, for instance, to the line 4.

An outwardly extended shelf wall or ledge 5 has impervious connection with the upper edges of the side walls 2 and end walls 3, and upwardly extended side walls 6 and end walls 7 have impervious connection with the outer edges of the shelf 5 and with each other. Panel members 8 are attached to the end walls 7 of the device and constitute convenient means for moving the device manually from place to place.

The bottle support and steam jet device comprises a plate 9 of approximately the same length and width as the length and width of the space within the walls 6 and 7 so that, when said plate 9 is placed within said space, it will rest upon the shelf 5 because said plate is of greater length and width than the length and width of the space below said shelf 5.

A seal device is attached to the plate 9 for cooperating with the water in the water receptacle to provide a seal to prevent the escape of steam around the marginal edges of the plate 9 and to require the steam to pass upwardly through the steam jet devices. This seal device comprises inwardly inclined downwardly extended end wall members 10 and inwardly inclined downwardly extended side wall members 11, all of said wall members 10 and 11 having their upper edges attached to the plate 9 and their ends attached to each other. This seal device formed by said wall members 10 and 11 extends downwardly in close contact with the inner edge of the shelf 5 and into the water and thereby cooperates with the water to confine nearly all of the steam within the space bordered by said wall members 10 and 11 (Figs. 2 and 3), to prevent the steam from passing upwardly across the marginal edges of the plate 9, and to require the steam to pass upwardly through the jet devices.

A number of jet devices comprising nozzles 12 have their lower ends attached to the plate 9 around holes through said plate, so that steam may pass upwardly through said nozzles. The plate 9 is pressed upwardly to form a number of radial upwardly extended beads 13 around each nozzle or jet device 12 so as to support the lower ends of the bottles 14 above the plate 9 and provide spaces or vents between said beads 13.

A number of upright wire posts 15 have their lower ends attached to the plate 9 and their upper ends and intermediate portions connected by spaced wires 16 extending around the series of posts 15 and thereby forming a frame-like enclosure around said posts and around the series of nozzles 12. Longitudinal wires 17 and transverse wires 18 are attached to the upper wires 16 and cooperate therewith to form a frame around each of the nozzles 12. A bottle 14 may be mounted in each of these frames substantially in the manner and in the position shown in Fig. 3. The bottle is inverted with the lower end of the neck of the bottle seated upon the beads 13 and thereby supported slightly above the plate 9, so that steam injected into the bottles will thoroughly sterilize the insides of the bottles and be permitted to escape through the spaces between the beads 13.

A handle comprising a standard 19 having its lower end attached to the plate 9 and a manually engageable portion 20 on the upper end of said standard may be employed to manipulate and operate the bottle supporting device. The standard 19 may be composed of twisted wires having their lower ends extended through the plate 9 and seated against the bottom of said plate and attached thereo. The lower ends of these wires are shown in Figs. 2 and 3 as being extended through the plate 9 and engaging the underside of said plate.

In using this device, the bottles are placed in different frames provided therefor. The bottles are inverted and the nozzles 12 are permitted to extend into the open necks of the bottles. An appropriate amount of water is placed in the lower part of the container. The bottle supporting device is then placed in the container, the seal device comprising the walls 10 and 11 being extended down into the water. When this water is heated, the steam generated thereby passes in jets through the nozzles 12 into the respective bottles. The bottles are thereby sterilized and cleansed and conditioned for further use. The bottle supporting device may easily be removed from the container and replaced as desired. It is entirely immaterial in what manner the water is heated, whether by the heat of a fuel burning stove or by electrical heat, and I do not restrict myself in any of these particulars.

It is apparent that the invention obtains all of its intended objects and purposes efficiently, conveniently and satisfactorily and may be varied within equivalent limits without departure from the nature and principle thereof. Without restricting myself in any unessential particulars, what I claim and desire to secure by Letters Patent is:—

1. A device of the character described comprising a receptacle adapted to contain water, a shelf in and along all sides of said receptacle, a plate insertable in and withdrawable from said receptacle and adapted to be supported on said shelf along all marginal edges of said plate, a seal device in connection with said plate having means adapted to extend downwardly in close contact with the entire inner edge of said shelf and into the water below said plate and substantially prevent the escape of steam between said plate and said shelf, and steam jet devices opening through and extending upwardly from said plate.

2. A device of the character described comprising a receptacle adapted to contain water, a shelf in and along all sides of said receptacle, a plate insertable in and withdrawable from said receptacle and adapted to be supported on said shelf along all marginal edges of said plate, a seal device in connection with said plate having means adapted to extend downwardly in close contact with the entire inner edge of said shelf and into the water below said plate and substantially prevent the escape of steam between said plate and said shelf, steam jet devices opening through and extending upwardly from said plate, and a frame in connection with said plate for supporting bottles in an inverted position in which said steam jet devices extend into the open ends of said bottles.

3. A device of the character described comprising a receptacle adapted to contain water, a plate insertable in and withdrawable from said receptacle, a shelf in and extending along all sides of said receptacle for supporting said plate above the bottom of said receptacle, a seal device in connection with said plate having means adapted to extend downwardly in close contact with the entire inner edge of said shelf and into the water below said plate and substantially prevent the escape of steam between said plate and said receptacle, steam jet devices opening through and extending upwardly from said plate and adapted to be extended into the open ends of inverted bottles, a frame attached to said plate for supporting bottles in inverted position in which said steam jet devices extend into the open ends of said bottles, and means in connection with said plate for supporting said bottles spaced above said plate.

RUSSELL A. MUELLER.